United States Patent
Bender et al.

(10) Patent No.: US 11,564,384 B2
(45) Date of Patent: Jan. 31, 2023

(54) MANAGE AND CONTROL PESTS INFESTATION USING MACHINE LEARNING IN CONJUNCTION WITH AUTOMATED DEVICES

(71) Applicant: International Business Machines Corporation, Armonk, NY (US)

(72) Inventors: Michael Bender, Rye Brook, NY (US); Rhonda L. Childress, Austin, TX (US); Stan K. Daley, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 16/010,878

(22) Filed: Jun. 18, 2018

(65) Prior Publication Data

US 2019/0380325 A1 Dec. 19, 2019

(51) Int. Cl.
| | | |
|---|---|---|
| *A01M 1/10* | (2006.01) | |
| *G06N 5/04* | (2006.01) | |
| *A01M 1/20* | (2006.01) | |
| *A01M 99/00* | (2006.01) | |
| *G06N 20/00* | (2019.01) | |
| *G06Q 50/10* | (2012.01) | |

(52) U.S. Cl.
CPC .............. *A01M 1/106* (2013.01); *A01M 1/20* (2013.01); *A01M 99/00* (2013.01); *G06N 5/04* (2013.01); *G06N 20/00* (2019.01); *G06Q 50/10* (2013.01)

(58) Field of Classification Search
CPC ........ A01M 1/106; A01M 1/20; A01M 99/00; G06N 20/00; G06N 5/04; G06Q 50/10
See application file for complete search history.

(56) References Cited

U.S. PATENT DOCUMENTS

| | | |
|---|---|---|
| 2006/0150470 A1 | 7/2006 | Ronnau |
| 2013/0156271 A1 | 6/2013 | Cimino |
| 2017/0027155 A1 | 2/2017 | Ehrlich et al. |
| 2017/0156304 A1 | 6/2017 | Hori et al. |
| 2017/0174731 A1 | 6/2017 | Kennedy et al. |
| 2017/0367317 A1 | 12/2017 | Groeneveld |
| 2018/0299842 A1* | 10/2018 | Reid ................ A01M 23/00 |

(Continued)

FOREIGN PATENT DOCUMENTS

| | | |
|---|---|---|
| CN | 104798766 A | 7/2015 |
| CN | 204616606 U | 9/2015 |
| CN | 106489607 A | 3/2017 |

OTHER PUBLICATIONS

"Computer Centre for Agricultural Pest Forecasting (CIPRA)", Government of Canada, Date modified: Jul. 28, 2017, 6 pages, <http://www.agr.gc.ca/eng/science-and-innovation/results-of-agricultural-research/computer-centre-for-agricultural-pest-forecasting-cipra/?id=1376403227682>.

(Continued)

*Primary Examiner* — Normin Abedin
(74) *Attorney, Agent, or Firm* — Monchai Chuaychoo

(57) ABSTRACT

Embodiments of the present invention provides a systems and methods for pest control. The system detects one or more pests based on receiving sensor data from one or more sensors associated with a predefined location. The system analyzes the sensor data with cognitive machine learning based on the detected pests. The system generates a treatment recommendation report based on the analysis and outputs the treatment recommendation report.

20 Claims, 3 Drawing Sheets

(56) References Cited

U.S. PATENT DOCUMENTS

2019/0246623 A1* 8/2019 Tews .................. A01M 31/002

OTHER PUBLICATIONS

Pogue, David, "8 Recognition Apps Work Almost Like Magic", Scientific American, Jul. 1, 2013, 8 pages, <https://www.scientificamerican.com/article/pogue-8-recognition-apps-work-almost-like-magic/#>.

Price, Emily, "Cicada Hunt Is Like Shazam for Insect Sounds", printed Apr. 4, 2018, 11 pages, <https://mashable.com/2013/08/30/cicada-hunt-app/#kxayUwdsHaqE>.

Stock, Matthew, "Pests and pathogens cost global agriculture $540 billion a year", Genetic Literacy Project, Jun. 2, 2017, 6 pages, <https://geneticliteracyproject.org/2017/06/02/pests-pathogens-cost-global-agriculture-540-billion-year/>.

Straus, Rebecca, "6 Signs Your House Has Termite Damage (And What To Do About It)", Rodale's Organic Life, Mar. 21, 2017, 11 pages, <https://www.rodalesorganiclife.com/home/6-signs-your-house-has-termite-damage-and-what-to-do-about-it>.

* cited by examiner

MANAGE AND CONTROL PESTS INFESTATION USING MACHINE LEARNING IN CONJUNCTION WITH AUTOMATED DEVICES

BACKGROUND OF THE INVENTION

The present invention relates generally to the field of pest control and more particularly to automated pest control.

Pest and pathogens cost global agriculture $540 billion dollars a year and termites can cause an additional $5 billion a year to homeowners. By identifying an infestation early, farmers or homeowners can take proactive actions (e.g., organic, chemical or physical) to prevent the pest problem from spreading and ruining homes and/or crops.

One of the phase regarding the current method of pest detection typically involves visual identification and frequent monitoring. The other phases involves actual treatment of pests. Regular observation is also critically important. Observation can broken into inspection and identification steps. Visual inspection, insect traps, and other methods are used to monitor pest levels. In addition, record-keeping is also vitality essential. Furthermore, knowledge target pest behavior, reproductive cycles and ideal temperature. Sometimes, visual identification of the affected area can even be too late (i.e., observing brittle wood due to a colony of termites).

Therefore, realizing a cognitive system utilizing smart devices for pest control has a fundamental interest in the agriculture and pest control industry.

SUMMARY

According to one embodiment of the present invention, a method is provided. The method comprising: detecting one or more pests based on receiving sensor data from one or more sensors associated with a predefined location; analyzing the sensor data with cognitive machine learning based on the detected pests; generating a treatment recommendation report based on the analysis; and outputting the treatment recommendation report.

Another embodiment of the present invention, a computer program product is provided. The computer program product comprising: one or more computer readable storage devices and program instructions stored on the one or more computer readable storage devices, the stored program instructions comprising: program instructions to detect one or more pests based on receiving sensor data from one or more sensors associated with a predefined location; program instructions to analyze the sensor data with cognitive machine learning based on the detected pests; program instructions to generate a treatment recommendation report based on the analysis; and program instructions to output the treatment recommendation report.

Another embodiment of the present invention, a computer system is provided. The computer system comprising: one or more computer processors; one or more computer readable storage devices; program instructions stored on the one or more computer readable storage devices for execution by at least one of the one or more computer processors, the stored program instructions comprising: program instructions to detect one or more pests based on receiving sensor data from one or more sensors associated with a predefined location; program instructions to analyze the sensor data with cognitive machine learning based on the detected pests; program instructions to generate a treatment recommendation report based on the analysis; and program instructions to output the treatment recommendation report.

DETAILED DESCRIPTION

Embodiments of the present invention recognize that improvements to pest control can be made by using machine learning techniques in conjunction with smart sensors. The invention leverages IoT (Internet of Things) technology to capture sounds and images to identify various pests in an environment (e.g., farms, homes, etc.). After storing the captured inputs, the system uses machine learning techniques to predict what actions are required based on historical infestations that have affected the location previously or similar locations previously. If the infestations are new then the system will analyze and recommend an action based on the current data. The system can account for several variables such as, the time of the year, predicted weather conditions and specific crops. By using this system, a user can take proactive action before they would see a problem solely relying on human tracking.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
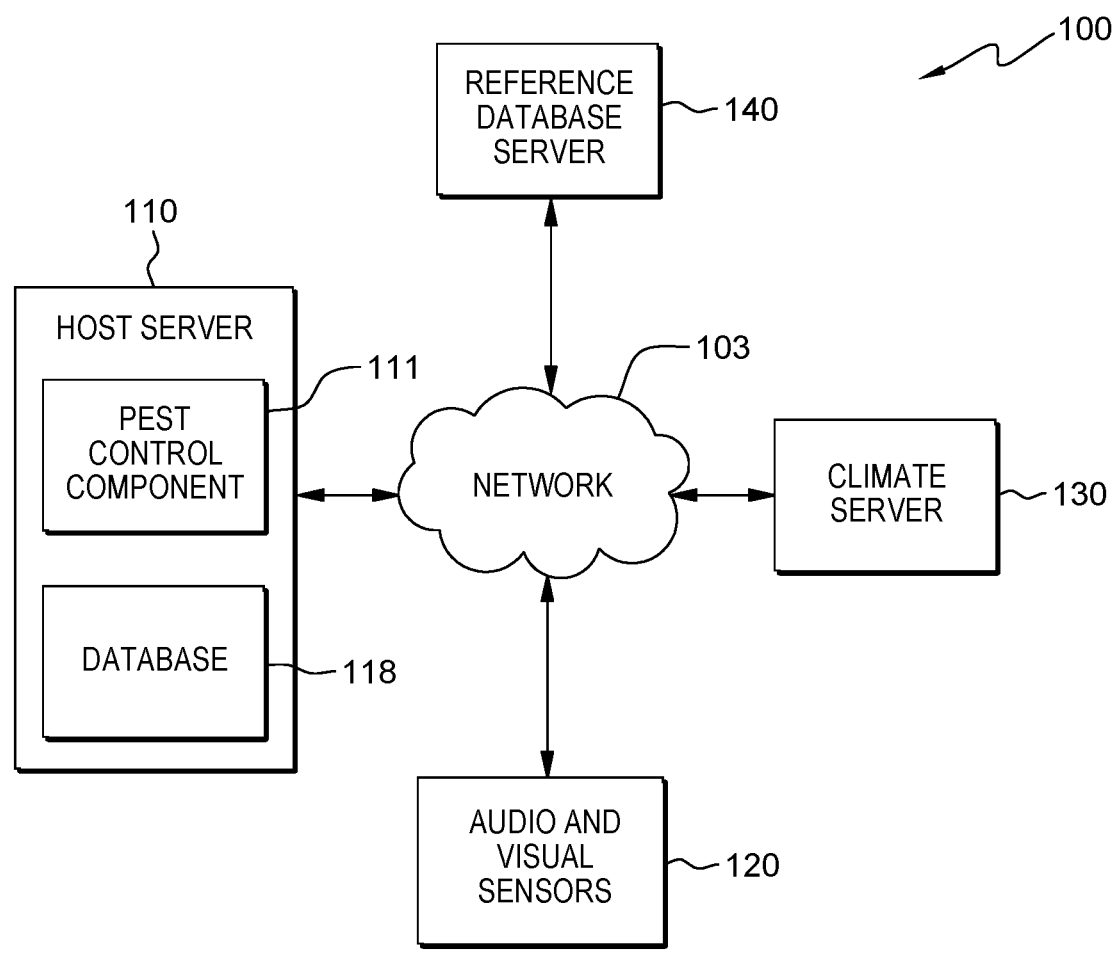
FIG. 1 is a functional block diagram illustrating the topology of the host server pest control environment 100, in accordance with an embodiment of the present invention.

FIG. 1 is a functional block diagram illustrating a host server pest control environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Host server pest control environment 100 includes host server 110, audio and visual sensors 120, climate server 130, and reference database server 140, all interconnected over network 103. Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between host server 110, audio and visual sensors 120, climate server 130, reference database server 140, and other computing devices (not shown) within host server pest control environment 100.

Host server 110 can be a standalone computing device, a management server, a web server, a mobile computing device, or any other electronic device or computing system capable of receiving, sending, and processing data. In other embodiments, host server 110 can represent a server computing system utilizing multiple computers as a server system, such as in a cloud computing environment. In another embodiment, host server 110 can be a laptop computer, a tablet computer, a netbook computer, a personal computer (PC), a desktop computer, a personal digital assistant (PDA), a smart phone, or any other programmable electronic device capable of communicating with audio and visual sensors 120, and other computing devices (not shown) within host server pest control environment 100 via network 103. In another embodiment, host server 110 represents a computing system utilizing clustered computers and components (e.g., database server computers, application server computers, etc.) that act as a single pool of seamless resources when accessed within host server pest control environment 100. Host server 110 includes pest control component 111 and database 118.

Pest control component 111 enables the present invention to manage and control pest infestations. In the depicted embodiment, pest control component 111 resides on host server 110. In another embodiment, pest control component 111 can reside on climate server 130, or reference database server 140. In the depicted embodiment, pest control component 111 consists of several components (refer to FIG. 2) such as pest detection component 112, target of pest component 113, data gathering component 114, analysis component 115, and cognitive sub-component component 116.

Database 118 is a repository for data used by pest control component 111. In the depicted embodiment, database 118 resides on host server 110. In another embodiment, database 118 may reside elsewhere within host server pest control environment provided that pest control component 111 has access to database 118. A database is an organized collection of data. Database 118 can be implemented with any type of storage device capable of storing data and configuration files that can be accessed and utilized by host server 110, such as a database server, a hard disk drive, or a flash memory. Database 118 uses one or more of a plurality of techniques known in the art to store a plurality of information. For example, database 118 may store information such as vegetation information and pest information. In another example, database 118 can contain historical information regarding prior treatment, prior infestations, prior user actions and prior weather conditions.

Audio and visual sensors 120 are one or more specialized devices (e.g., IoT wireless camera, IoT wireless microphone, etc.) that are capable of detecting and process audio and visual environment in the vicinity of the devices. In another embodiment, audio and visual sensors 120 can include autonomous drones equipped with onboard camera and microphone to aid in identification of pests.

Climate server 130 contains weather related information, such as, but is not limited to, a historical weather pattern, a current weather condition, and a future weather forecast. Climate server 130 can be a standalone computing device, a management server, a web server, a mobile computing device, or any other electronic device or computing system capable of receiving, sending, and processing data. In other embodiments, climate server 130 can represent a server computing system utilizing multiple computers as a server system, such as in a cloud computing environment. In another embodiment, host server 110 can be a laptop computer, a tablet computer, a netbook computer, a personal computer (PC), a desktop computer, a personal digital assistant (PDA), a smart phone, or any other programmable electronic device capable of communicating with reference database server 140, and other computing devices (not shown) within host server pest control environment 100 via network 103. In another embodiment, climate server 130 represents a computing system utilizing clustered computers and components (e.g., database server computers, application server computers, etc.) that act as a single pool of seamless resources when accessed within host server pest control environment 100.

Reference database server 140 is a server that contains various reference related information that may help diagnose and treat pest infestation. For example, reference database server 140 can climate and weather related information for the location of the users. Reference database server 140 can be a standalone computing device, a management server, a web server, a mobile computing device, or any other electronic device or computing system capable of receiving, sending, and processing data. In other embodiments, reference database server 140 can represent a server computing system utilizing multiple computers as a server system, such as in a cloud computing environment.

Figure 2:
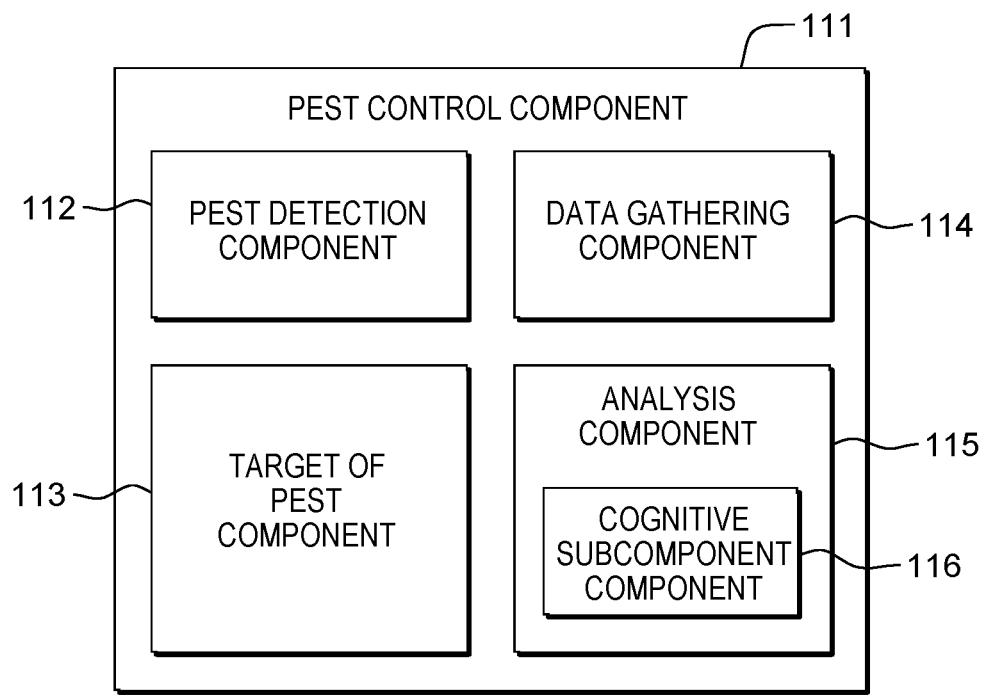
FIG. 2 is a functional block diagram illustrating the components of pest control component 111, in accordance with an embodiment of the present invention.

FIG. 2 is a functional block diagram illustrating the components of pest control component 111, in accordance with an embodiment of the present invention. Pest control component 111 includes pest detection component 112, target of pest component 113, data gathering component 114 and analysis component 115 along with cognitive sub-component 116.

Pest detection component 112 of the present invention provides the capability of identifying and discerning of pests based on the received data from audio and visual sensors 120 (e.g., IoT wireless camera, IoT wireless microphones, drones, etc.). In an embodiment, pest detection component 112 can recognize and differentiate various types of pests nearby the users. For example, pest detection component 112 identifies a swarm of beetles (e.g., Southern Corn Leaf Beetle, Asiatic garden beetle, etc.) known to target corn fields by the auditory pattern of their wingbeats. In another example, pest detection component 112 detects a sound of wood being chewed on an apple tree. However, it is not able to determine the exact pest type, therefore, pest detection component 112 may send an autonomous drone to investigate and validate the type of pests.

Target of pest component 113 of the present invention provides the capability of identifying and discerning the target of pest infestation (e.g., livestock, vegetation, etc.) based on the received data from the various sensors (e.g., IoT wireless camera, IoT wireless microphones, etc.). In an embodiment, target of pest component 113 can recognize and differentiate various types of vegetation (i.e. crops) grown by the users being targeted by pests. For example, a swarm of Southern Corn Leaf beetles identified by pest detection component 112 was detected within a vicinity of the corn field belonging to the user. Target of pest component 113 correctly identifies the target of the beetles, the corn field via IoT devices.

In another embodiment, target of pest component 113 can recognize and differentiate livestock that are targeted by pests. For example, gnat and flies were identified earlier by pest detection component 112. However, little is known what the pests are doing in the vicinity on the farm. An IoT device detects these pest buzzing around the herd of cattle grazing on the farm. Therefore, target of pest component 113 is able to correctly identify the target, the herd of cattle, of the gnats and flies.

In yet another embodiment, target of pest component 113 can recognize and differentiate the target of termites (i.e., wood beam of the foundation of a house). For example, target of pest component 113 can identify the type of wood being targeted by termites. Target of pest component 113 is able to determine the pine wood frame of the house of the user as the target of termites based on the information sent by the IoT devices where the device picked up the sound of termites chewing on the wood.

Data gathering component 114 of the present invention provides the capability of retrieving various information (e.g., reference data on insects, reference data on the weather, etc.) from various databases (e.g., reference database server 140, etc.). In an embodiment, pest detection component 112 can retrieve vegetation data (i.e., corn) from reference database server 140. For example, database server 140 can contain general reference data on the corn crop such as ideal moisture level, ideal growing temperature, and ideal soil composition. This will further aid pest control component 111 with identifying issues (e.g., pests, weather, etc.) that might hinder optimal corn production.

In an embodiment, pest detection component 112 can retrieve pest data (i.e., corn beetle) from reference database server 140. For example, reference database server 140 can contain general reference data on the corn beetle such as favorite crop/source of food, life span, and gestation period and habit/behavior pattern. This will further aid pest control component 111 with identifying issues that might hinder optimal corn production.

Analysis component 115 of the present invention provides the capability of analyzing all received data and determining the several options for pest treatment. It is noted that analysis component 115 contains a subcomponent, cognitive sub-component 116. In an embodiment, pest detection component 112 can recognize a new pest infestation and immediately determine one or more options for the user. In another embodiment, pest detection component 112 through cognitive sub-component 116 can recognize an early sign of pest infestation based on similar situation (i.e., same crops and pests) from the prior year and make a similar recommendation for treatment. Additionally, cognitive sub-component 116 can learn (e.g., machine learning, deep learning, etc.) over time of new, current and/or prior infestation and take a corrective action. It is noted that not all recommendation made by analysis component 115 results in an extermination plan for pests. It is possible that no action is taken based on pre-determined parameters. For example, a crop loss percentage of 10% is programmed into the system when the growth of corn is decimated by pests and/or weather, the pest control system should only take action when the loss is greater than that 10% threshold. In another example, no action is taken on a swarm of beetles, targeting wheat, due to the incoming weather pattern where a cold front is predicted to come through the farm. The cold front is cold enough to kill the beetles but not cold enough to hurt the wheat fields.

Figure 3:
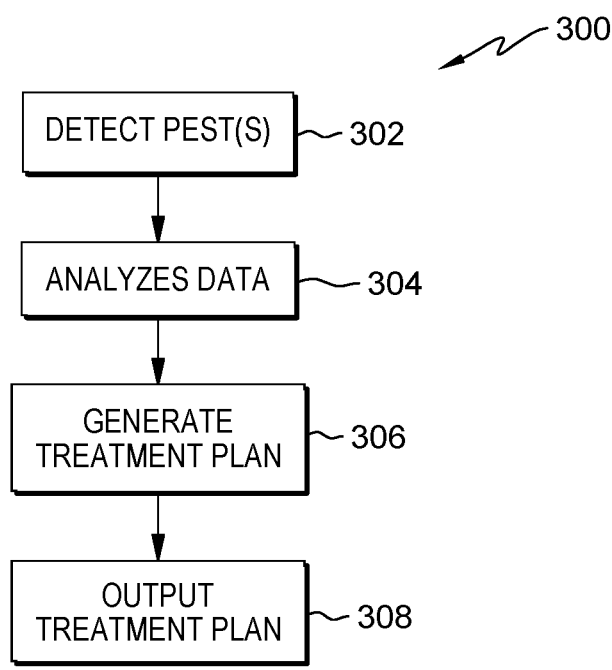
FIG. 3 is a flowchart, designated as 300, depicting operational steps of method for executing the host server pest control environment 100, in accordance with an embodiment of the present invention.

FIG. 3 is a flowchart, designated as 300, depicting operational steps of method for executing the host server pest control environment 100, in accordance with an embodiment of the present invention.

Pest control component 111 detect pest(s) (step 302). In an embodiment, pest control component 111 through pest detection component 112 automatically detect the presence of pests based on audio and visual sensors 120 located throughout the land and/or dwelling belonging to the users. For example, an IoT microphone detects sound of a large number of earworm larvae emerging from their cocoon. In order to confirm the type of larvae, pest control component 111 through pest detection component 112 can control the nearest video IoT devices to capture the picture of the larvae for a visual confirmation and identification. Furthermore, pest control component 111 through pest detection component 112 can direct autonomous devices such as drones to investigate the source of the sound and confirm the type of insects by a visual identification process. The visual identification method can leverage any current technology to identify pests.

After detecting pests, pest control component 111 determines the target of the pests. In an embodiment, pest control component 111 through target of pest component 113 determine the type of crops (e.g., agriculture crops, a single rose bush, etc.) affected by the identified pest from the prior step (step 302). For example, using audio and visual sensors 120 (i.e., smart devices) located throughout the property, pest control component 111 through target of pest component 113 confirms the type of vegetation (i.e., corn) where the earworm larvae have emerged.

In another embodiment, pest control component 111 through target of pest component 113 determine the type of livestock (e.g., cattle, pigs, etc.) affected by the identified pest from the prior step (step 302). For example, using audio and visual sensors 120 (i.e., smart devices) located throughout the property, pest control component 111 through target of pest component 113 confirms the type of livestock (i.e., cattle) where the gnats and flies have been accumulating.

In yet another embodiment, pest control component 111 through target of pest component 113 determine the type of livestock (e.g., cattle, pigs, etc.) affected by the identified pest from the prior step (step 302). For example, using smart dev audio and visual sensors 120 (i.e., smart devices) located throughout the property, pest control component 111 through target of pest component 113 confirms the type of livestock (i.e., cattle) where the gnats and flies have been accumulating.

In another embodiment, pest control component 111 does not determine vegetation type since the identified pest is not associated with consumption of any vegetation In yet another embodiment, target of pest component 113 can recognize and differentiate the target of termites (i.e. wood). For example, target of pest component 113 can identify the type of wood being targeted by termites. Target of pest component 113 is able to determine the pine wood frame of the house of the user as the target of termites based on the information sent by the audio and visual sensors 120 (i.e., smart devices) where the device picked up the sound of termites chewing on the wood and drones were sent to validate the location of the infestation. Furthermore, pest control component 111 can detect and identify a family of pigeons in the attic of the house of the user. However, there were no property (i.e., attic eve) destroyed since the pigeons were merely using the outside nook of the attic for shelter.

After detecting the pest and target of pests, pest detection component 112 can retrieve data to help with the decision making process. In an embodiment, pest control component 111 retrieves reference data to help perform further analysis on the new (i.e., no prior interaction) identified pest. For example, pest control component 111 retrieves various data (e.g., life span, nesting habits, source of food, etc.) from reference database server 140 associated with the family of pigeons living in attic.

Pest control component 111 analyzes data (step 304). In an embodiment, pest control component 111 can analyze data through data gathering component 114. Data gathering component 114 can aggregated data from the following sources, but not limited to, pest detection component 112, target of pest component 113, database 118, climate server 130, and reference database server 140.

Pest control component 111 generate treatment plan (step 306). After aggregating data, pest control component 111 can start analyzing the data via analysis component 115. The analysis process can involve several decision selections such as choosing the best type of pest control method (e.g., biological predator, pesticides, physical traps, etc.) and the best application of the pest control method (i.e., human worker to trap or send in drones to drop pesticides).

In an embodiment, pest control component through cognitive sub-component 116 can recall if the detected pests were from similar interactions. If cognitive sub-component 116 recalls from database 118 that the infestations were the same then it can retrieve the treatment plan from previous year. For example, pest control component 111 determines that the earworm larvae infested the corn crop last year (i.e., spring time) in the same section of the farm from database 118. Otherwise, if the situation has changed such as the weather is different (i.e., freezing spell) and could possibly interfere with the pests without interaction from pest detection component 112 then cognitive sub-component 116 can choose to ignore the previous treatment plan and create a new one based on new conditions.

Pest control component outputs treatment plan (step 308). In an embodiment, after retrieving prior interaction data and analyzing other current variables (e.g., weather conditions, soil conditions, etc.) pest control component 111 through analysis component 115 determines treatment plan and outputs the treatment recommendation report to the user. Pest control component 111 can wait for user input regarding the next steps. For example, the user may tell pest control component 111 to take no further action or that the user may take action themselves based on the treatment recommendation report. It is noted that pest control component 111 can bypass the user input and perform pest control based on the extermination plan by using remote autonomous devices (e.g., drones with pesticides, etc.) if the user has that feature enabled in the setting. It is further noted that some identified pests may not warrant an extermination solution. For example, a single bug was identified eating a peach. Based on historical data for that crop and small volume grown, pest control component 111 determines that no treatment is necessary at the moment and recommends constant monitoring. It is noted that a treatment plan can be created/output to the users for each infestations. The user can select the frequency on receiving the treatment recommendation report or can set the system to autonomously and automatically exterminate pests without any user input (i.e. zero treatment plan output). It is further noted that cognitive sub-component 116 can save all decisions, analysis and treatment plans in database 118 as part of the unsupervised learning process (i.e., cognitive learning).

In another embodiment, pest control component 111 does not output a treatment plan based on the weather forecast. For example, a cold front is moving into the area that will kill off the pests (i.e. corn beetle) but not the crops (i.e. corn). Therefore, pest control component 111 determines no action is needed regarding the corn beetle. However, a treatment recommendation report is generated and sent to the users.

Figure 4:
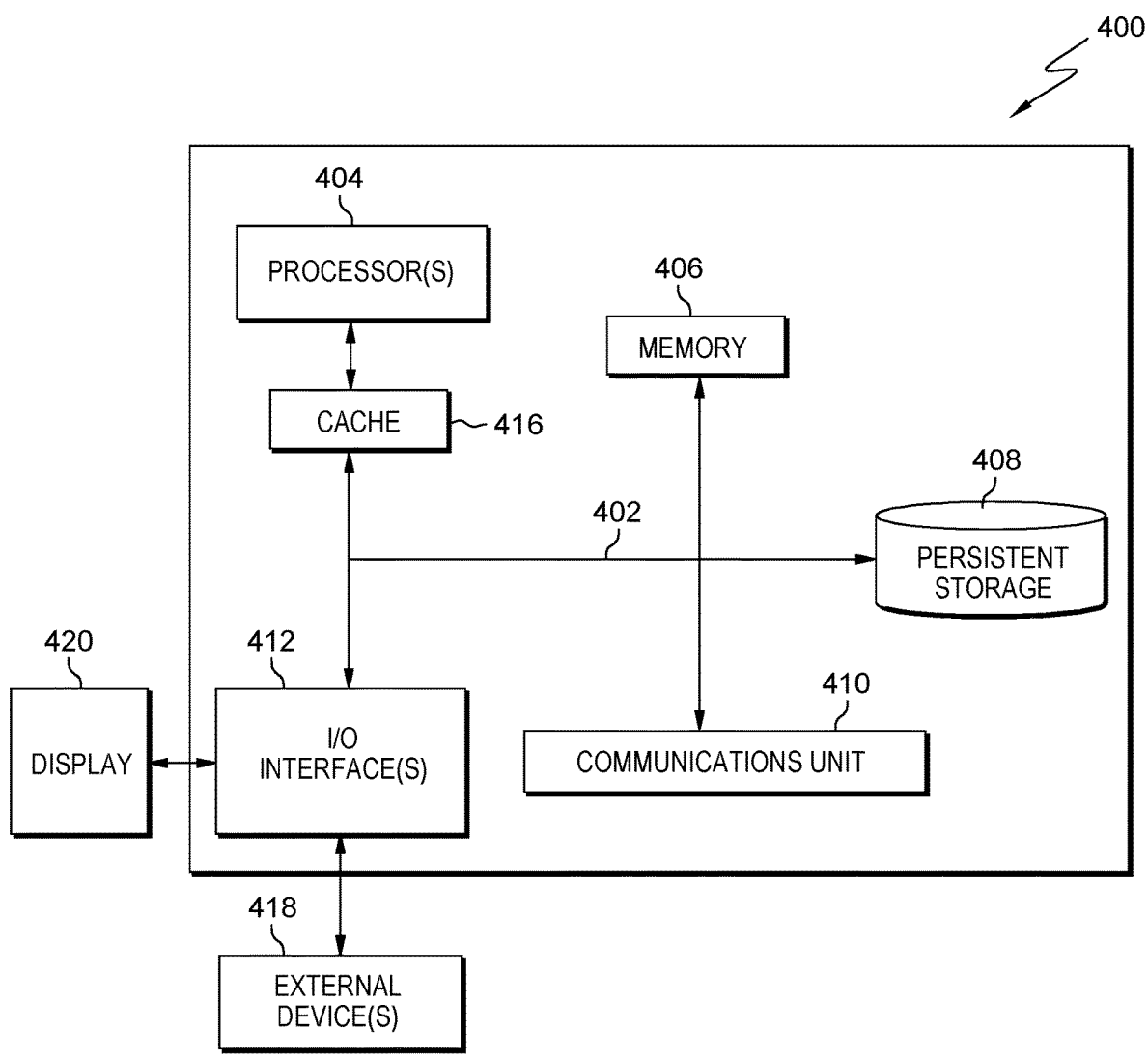
FIG. 4 depicts a block diagram, designated as 400, of components of the server computer executing the program within the host server, in accordance with an embodiment of the present invention.

FIG. 4 depicts a block diagram, designated as 400, of components of the server computer executing the program within the host server accelerator environment of FIG. 1, in accordance with an embodiment of the present invention.

Host server 110 can include processor(s) 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processor(s) 404 by holding recently accessed data, and data near recently accessed data, from memory 406.

Program instructions and data used to practice embodiments of the present invention, e.g., pest control component 111 and database 118, can be stored in persistent storage 408 for execution and/or access by one or more of the respective processor(s) 404 of host server 110 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of climate server 130. In these examples, communications unit 410 includes one or more network interface cards. Communications unit 410 may provide communications through the use of either or both physical and wireless communications links. Pest control component 111 and database 118 may be downloaded to persistent storage 408 of host server 110 through communications unit 410.

I/O interface(s) 412 allows for input and output of data with other devices that may be connected to host server 110. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., pest control component 111 and database 118 on host server 110, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or the lenses of a head mounted display. Display 420 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for pest control, the method comprising:
   detecting one or more pests based on receiving sensor data from one or more sensors associated with a predefined location, wherein detecting the one or more pests comprising:
      receiving an auditory pattern based on the one or more pests by the one or more sensors wherein the auditory pattern comprises sounds made by the one or more pests;
      determining a pest type based on the received auditory pattern;
      responsive to determining the pest type, identifying the one or more pests; and
      responsive to not able to determine the pest type, verifying the one or more pests based on visual identification from the one or more sensors;
   analyzing the sensor data with cognitive machine learning based on the detected pests;
   generating a treatment recommendation report based on the analysis; and
   outputting the treatment recommendation report.

2. The method of claim 1, wherein the sounds made by the one or more pests consisting of wingbeat pattern of certain insects, chewing woods and sound of larvae merging from their cocoon stage.

3. The method of claim 1, wherein analyzing the sensor data with cognitive machine learning based on the detected pests further comprises:
   aggregating the one or more sensor data, a reference data, a first database, and climate data, wherein the first database comprises historical data;
   selecting a pest control method based on the identified one or more pests, wherein the pest control method comprises at least one of pesticides, traps, and biological predators; and
   calculating action plan to apply the pest control method.

4. The method of claim 3, further comprises:
   retrieving data from the first database, wherein the data comprises one or more previous treatment plans.

5. The method of claim 1, wherein outputting the treatment recommendation report further comprises:
   sending the treatment recommendation report to one or more users and awaiting user response;
   responsive to user deciding to ignore the treatment recommendation report, saving the report to a first database; and
   responsive to user deciding perform a pest control method manually based on the treatment recommendation report, saving the report to a first database.

6. The method of claim 5, further comprises:
   responsive to user deciding to allow automatic treatment, sending an autonomous device to perform a pest control method based on the treatment recommendation report.

7. The method of claim 1, wherein the one or more sensors comprise at least one of a camera, a microphone, or a drone.

8. A computer program product for pest control, the computer program product comprising:
   one or more computer readable storage devices and program instructions stored on the one or more computer readable storage devices, the stored program instructions comprising:
   program instructions to detect one or more pests based on receiving sensor data from one or more sensors associated with a predefined location, wherein program instructions to detect the one or more pests comprising:
      program instructions to receive an auditory pattern based on the one or more pests by the one or more sensors wherein the auditory pattern comprises sounds made by the one or more pests;
      program instructions to determine a pest type based on the received auditory pattern;
      responsive to determining the pest type, program instructions to identify the one or more pests; and
      responsive to not able to determine the pest type, program instructions to verify the one or more pests based on visual identification from the one or more sensors:
   program instructions to analyze the sensor data with cognitive machine learning based on the detected pests;
   program instructions to generate a treatment recommendation report based on the analysis; and
   program instructions to output the treatment recommendation report.

9. The computer program product of claim 8, wherein the sounds made by the one or more pests consisting of wingbeat pattern of certain insects, chewing woods and sound of larvae merging from their cocoon stage.

10. The computer program product of claim 8, wherein program instructions to analyze the sensor data with cognitive machine learning based on the detected pests further comprises:
   program instructions to aggregate the one or more sensor data, a reference data, a first database, and climate data, wherein the first database comprises historical data;
   program instructions to select a pest control method based on the identified one or more pests, wherein the pest control method comprises at least one of pesticides, traps, and biological predators; and program instructions to calculate action plan to apply the pest control method.

11. The computer program product of claim 10, the stored program instructions further comprises:

program instructions to retrieve data from the first database, wherein the data comprises one or more previous treatment plans.

12. The computer program product of claim 8, wherein program instructions to output the treatment recommendation report further comprises:

program instructions to send the treatment recommendation report to one or more users and awaiting user response;

responsive to user deciding to ignore the treatment recommendation report, program instructions to save the report to a first database; and responsive to user deciding perform a pest control method manually based on the treatment recommendation report, program instructions to save the report to a first database.

13. The computer program product of claim 12, the stored program instructions further comprises:

responsive to user deciding to allow automatic treatment, program instructions to send an autonomous device to perform a pest control method based on the treatment recommendation report.

14. The computer program product of claim 8, wherein the one or more sensors comprise at least one of a camera, a microphone, or a drone.

15. A computer system for pest control, the computer system comprising:

one or more computer processors;

one or more computer readable storage devices;

program instructions stored on the one or more computer readable storage devices for execution by at least one of the one or more computer processors, the stored program instructions comprising:

program instructions to detect one or more pests based on receiving sensor data from one or more sensors associated with a predefined location, wherein program instructions to detect the one or more pests comprising:

program instructions to receive an auditory pattern based on the one or more pests by the one or more sensors wherein the auditory pattern comprises sounds made by the one or more pests;

program instructions to determine a pest type based on the received auditory pattern;

responsive to determining the pest type, program instructions to identify the one or more pests; and responsive to not able to determine the pest type, program instructions to verify the one or more pests based on visual identification from the one or more sensors:

program instructions to analyze the sensor data with cognitive machine learning based on the detected pests;

program instructions to generate a treatment recommendation report based on the analysis; and program instructions to output the treatment recommendation report.

16. The computer system of claim 15, wherein the sounds made by the one or more pests consisting of wingbeat pattern of certain insects, chewing woods and sound of larvae merging from their cocoon stage.

17. The computer system of claim 15, wherein program instructions to analyze the sensor data with cognitive machine learning based on the detected pests further comprises:

program instructions to aggregate the one or more sensor data, a reference data, a first database, and climate data, wherein the first database comprises historical data;

program instructions to select a pest control method based on the identified one or more pests, wherein the pest control method comprises at least one of pesticides, traps, and biological predators; and program instructions to calculate action plan to apply the pest control method.

18. The computer system of claim 17, the stored program instructions further comprises:

program instructions to retrieve data from the first database, wherein the data comprises one or more previous treatment plans.

19. The computer system of claim 15, wherein program instructions to output the treatment recommendation report further comprises:

program instructions to send the treatment recommendation report to one or more users and awaiting user response;

responsive to user deciding to ignore the treatment recommendation report, program instructions to save the report to a first database; and responsive to user deciding perform a pest control method manually based on the treatment recommendation report, program instructions to save the report to a first database.

20. The computer system of claim 15, the stored program instructions further comprises:

responsive to user deciding to allow automatic treatment, program instructions to send an autonomous device to perform a pest control method based on the treatment recommendation report.

* * * * *